United States Patent
Fiumano et al.

(10) Patent No.: US 9,331,905 B1
(45) Date of Patent: May 3, 2016

(54) CONFIGURING ETHERNET ELEMENTS VIA ETHERNET LOCAL MANAGEMENT INTERFACE

(71) Applicant: Sprint Communications Company L.P., Overland Park, KS (US)

(72) Inventors: Michael Francis Fiumano, McLean, VA (US); Aaron Paul Hinkle, Centreville, VA (US); Seng Chai Gan, Ashburn, VA (US)

(73) Assignee: Sprint Communication Company L.P., Overland Park, KS (US)

( * ) Notice: Subject to any disclaimer, the term of this patent is extended or adjusted under 35 U.S.C. 154(b) by 34 days.

(21) Appl. No.: 14/328,142

(22) Filed: Jul. 10, 2014

(51) Int. Cl.
*H04L 12/56* (2006.01)
*H04L 12/24* (2006.01)

(52) U.S. Cl.
CPC .................................... *H04L 41/0806* (2013.01)

(58) Field of Classification Search
CPC ................................................ H04L 41/0803
USPC ......... 370/466, 389, 428, 222, 223, 252, 254, 370/255, 401
See application file for complete search history.

(56) References Cited

U.S. PATENT DOCUMENTS

| | | | | |
|---|---|---|---|---|
| 6,958,996 B2 * | 10/2005 | Xiong | ................. | H04L 61/2015 370/254 |
| 7,136,374 B1 * | 11/2006 | Kompella | ............... | H04L 45/10 370/352 |
| 7,586,843 B1 * | 9/2009 | Alcazaren | ............. | H04L 12/437 370/222 |
| 8,144,699 B2 * | 3/2012 | Vinneras | ............. | H04L 12/2898 370/389 |
| 8,289,973 B2 * | 10/2012 | DelRegno | ........... | H04L 12/4633 370/395.42 |
| 8,392,509 B1 * | 3/2013 | Klessig | ............... | H04L 41/0803 370/419 |
| 2006/0165095 A1 * | 7/2006 | Samprathi | ........... | H04L 43/0817 370/395.53 |
| 2006/0187937 A1 * | 8/2006 | Townsley | ............ | H04L 12/4641 370/395.53 |
| 2006/0221971 A1 * | 10/2006 | Andrieux | ................ | H04L 45/54 370/392 |
| 2006/0245439 A1 * | 11/2006 | Sajassi | ................ | H04L 12/2881 370/400 |
| 2007/0115962 A1 * | 5/2007 | Mammoliti | ......... | H04L 41/0806 370/389 |
| 2007/0226325 A1 * | 9/2007 | Bawa | .................. | H04L 12/4641 709/223 |
| 2009/0083403 A1 * | 3/2009 | Xu | ...................... | H04L 12/4679 709/220 |
| 2011/0004937 A1 * | 1/2011 | Staats | ................... | H04L 41/082 726/24 |
| 2012/0087232 A1 * | 4/2012 | Hanabe | .................. | H04L 43/10 370/217 |
| 2013/0054761 A1 * | 2/2013 | Kempf | .................. | H04L 47/781 709/220 |
| 2013/0322437 A1 * | 12/2013 | Raszuk | ................... | H04L 45/04 370/389 |
| 2014/0056125 A1 * | 2/2014 | Guellal | ................... | H04L 45/28 370/225 |
| 2015/0049631 A1 * | 2/2015 | Heron | .................... | H04L 45/02 370/254 |
| 2015/0088983 A1 * | 3/2015 | Lindquist | ............... | H04L 29/06 709/203 |
| 2015/0110111 A1 * | 4/2015 | Song | ................... | H04L 12/6418 370/392 |

* cited by examiner

Primary Examiner — Parth Patel

(57) ABSTRACT

Examples disclosed herein provide systems, methods, and software to establish service configurations via Ethernet Local Management Interface. In one example, a method of operating a communication system to configure Ethernet elements includes, in a request Ethernet element, determining identification data based on a media access control (MAC) address and a virtual local area network (VLAN) for the requesting Ethernet element. The method further provides, in the requesting Ethernet element, transferring, via Ethernet Local Management Interface (E-LMI), the identification data to a receiving Ethernet element. The method also includes, in the receiving Ethernet element, receiving the identification information, transferring a service configuration request based on the identification information to a configuration management system, and receiving a service configuration from the configuration management system.

14 Claims, 6 Drawing Sheets

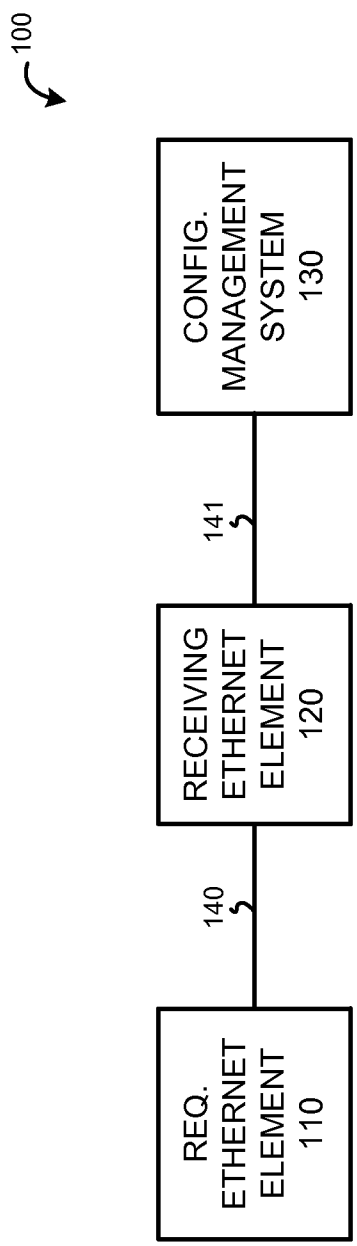

CONFIGURING ETHERNET ELEMENTS VIA ETHERNET LOCAL MANAGEMENT INTERFACE

TECHNICAL BACKGROUND

Large companies and organizations often require data to be communicated across large geographic areas. Accordingly, users and systems within the network may transmit data from one geographic location to another using services provided by a network provider. In some examples, customer edge routers provide an Ethernet interface between a customer's local area network (LAN) and the provider's core network, which includes one or more provider edge routers. In some examples, to configure the various customer edge routers, an Ethernet Local Management Interface (E-LMI) may be employed to configure the routers in the network from a central location. For example, a communications provider may use the provider edge routers to push configuration settings to the customer edge routers without the need of traveling to the individual customer sites.

In some communication system instances, a plurality of customers may use the same PE routers to link geographically different locations. Accordingly, as each customer edge device is initiated for the network, appropriate settings and preferences must be configured for both the customer edge router and corresponding provider edge router responsible for the communication. As a result, configuring each of the routers for the individual customer requirements may become burdensome due to the number of customers, the locations of the various routers, and the different settings required for each of the customers.

OVERVIEW

Examples disclosed herein provide systems, methods, and software to establish service configurations via an Ethernet Local Management Interface. In one example, a method of operating a communication system to configure Ethernet elements includes, in a requesting Ethernet element, determining identification data based on a media access control (MAC) address and a virtual local area network (VLAN) for the requesting Ethernet element. The method further provides, in the requesting Ethernet element, transferring, via Ethernet Local Management Interface (E-LMI), the identification data to a receiving Ethernet element. The method also includes, in the receiving Ethernet element, receiving the identification information, transferring a service configuration request based on the identification information to a configuration management system, and receiving a service configuration from the configuration management system.

BRIEF DESCRIPTION OF THE DRAWINGS

FIG. 1 illustrates a communication system to configure Ethernet element connections via Ethernet Local Management Interface.

DETAILED DESCRIPTION

Figure 3:
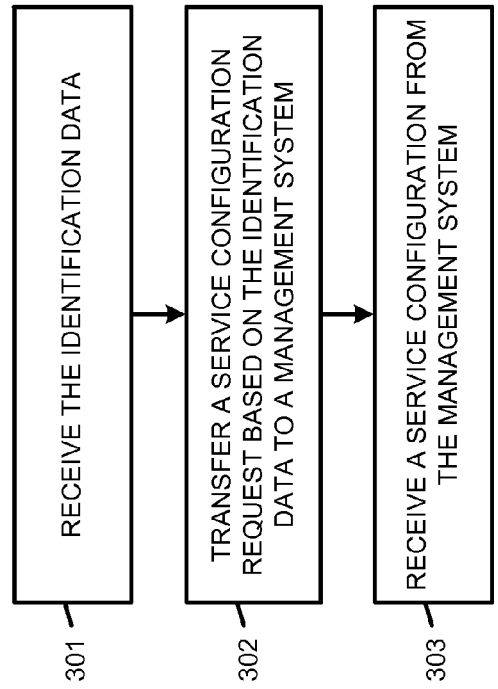
FIG. 3 illustrates a method of operating a receiving Ethernet element to determine a service configuration for a requesting Ethernet element.

FIG. 1 illustrates a communication system 100 to configure Ethernet element connections via Ethernet Local Management Interface (E-LMI). Communication system 100 includes requesting Ethernet element 110, receiving Ethernet element 120, and configuration management system 130. Receiving Ethernet element 120 communicates with requesting Ethernet element 110 over communication link 140, and further communicates with configuration management system 130 over communication link 141. In some examples, requesting Ethernet element 110 comprises a customer edge (CE) router, and receiving Ethernet element 120 comprises a provider edge (PE) router in a multiprotocol label switching (MPLS) architecture. In other instances, requesting Ethernet element 110 and receiving Ethernet element 120 may comprise virtual machines within a cloud architecture.

In operation, requesting Ethernet element 110 and receiving Ethernet element 120 may communicate using E-LMI to configure the connection between the two elements. E-LMI may be used to automatically configure devices within an Ethernet network based on a variety of network settings, as well as the hardware settings of the devices within the system. In the present example, requesting Ethernet element 110 communicates with receiving Ethernet element 120 to implement an initial configuration between the two elements. To accomplish this task, requesting Ethernet element 110 transfers identification information based on the media access control (MAC) address and virtual local area network (VLAN) for requesting Ethernet element 110 to receiving Ethernet element 120. Responsive to the request, receiving Ethernet element 120 identifies a service configuration for the Ethernet connection using configuration management system 130.

In some instances, management system 130 determines the service configurations based on the quality of service, the type of service, or any other similar basis related to requesting Ethernet element 110. For example, if requesting Ethernet element 110 were a CE router, and transferred identification information to a PE router. The management system connected to the PE router could configure the connection between the CE and PE routers based on the quality of service defined for the customer, which may be based on the payment tier for the customer, the type of communications that are needed for the customer, or any other quality of service measurement.

Figure 2:
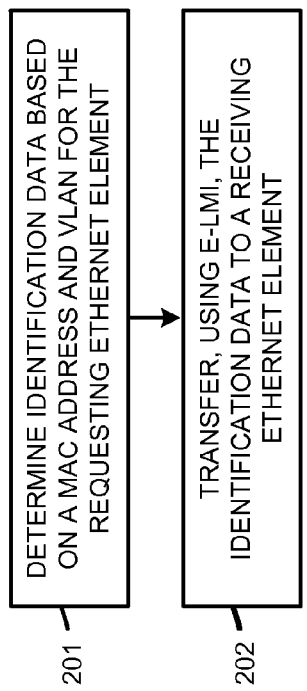
FIG. 2 illustrates a method of operating a requesting Ethernet element to request a service configuration via Ethernet Local Management Interface.

FIG. 2 illustrates a method of operating a requesting Ethernet element to request a service configuration via Ethernet Local Management Interface. As depicted, the method begins by determining identification data based on a MAC address and a VLAN for the requesting Ethernet element (201). This MAC address and VLAN may be used to identify the device, a well as the service that is going to be used with the device. For example, if a customer is connecting a new CE router to a MPLS architecture, the VLAN may be used to identify the type of network used in the service, and the MAC may be used to identify the particular device for the service. Once the identification information is determined, the requesting Ethernet element may transfer the identification data to a receiving Ethernet element using E-LMI (202).

FIG. 3 illustrates a method of operating a receiving Ethernet element to determine a service configuration for a requesting Ethernet element. As illustrated, the receiving Ethernet element receives the identification data from the requesting Ethernet element (301). In response to receiving the identification data, the receiving Ethernet element transfers a service configuration request based on the identification data to a configuration management system (302), and receives a service configuration from the management system (303). In some examples, the service configuration request may include the identification data for comparison with a data structure in the configuration management system. For instance, an administrator or some other management service may store element configurations in the configuration management service based on the quality or type of service. Accordingly, when new devices, such as customer edge routers, are initialized within a network, the receiving Ethernet elements may configure the connections with the new devices using the pre-stored configurations.

Figure 4:
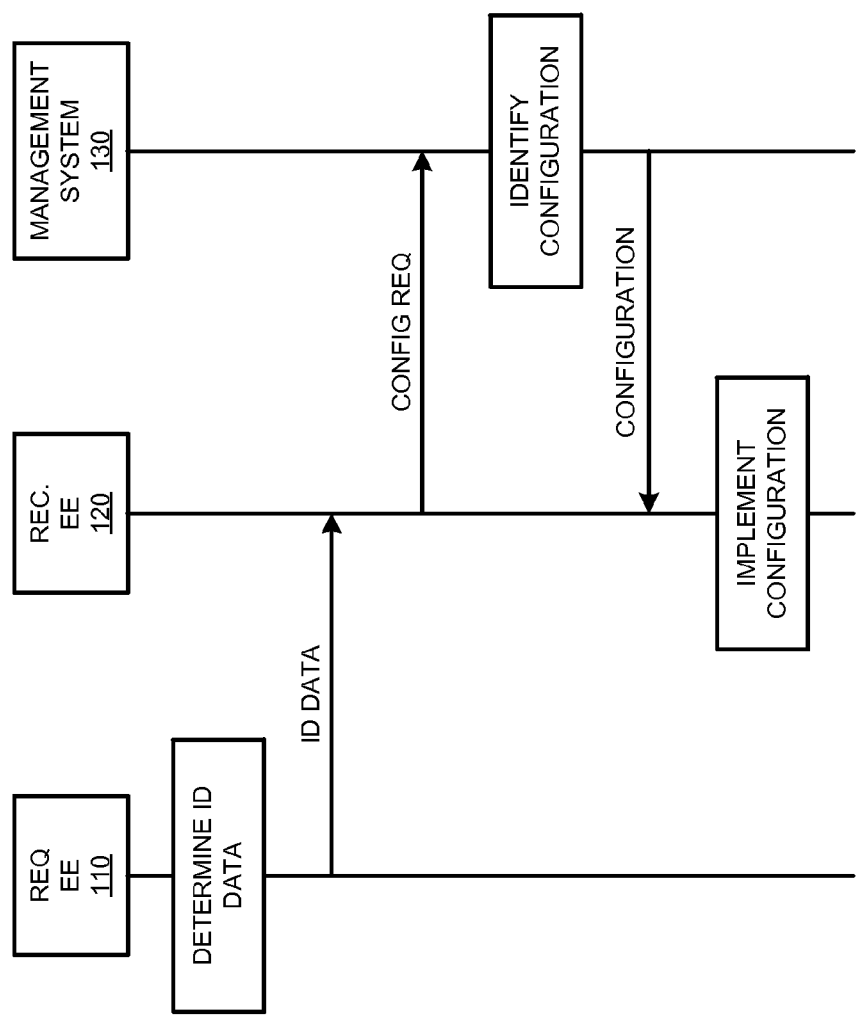
FIG. 4 illustrates a timing diagram to configure Ethernet element connections in a communication system via Ethernet Local Management Interface.

FIG. 4 illustrates a timing diagram to configure Ethernet element connections in communication system 100 via E-LMI. As illustrated in FIG. 4, requesting Ethernet element 110 determines identification data based on the MAC address and VLAN for the element. Once the identification data is determined, the identification data is transferred to receiving Ethernet element 120. There, in response to receiving the identification data, a configuration request is transferred to configuration management system 130 based on the identification data.

Once the configuration request is receiving by management system 130, management system 130 identifies a service configuration for the connection between requesting Ethernet element 110 and receiving Ethernet element 120. To identify this configuration, in some examples, an administrator or other management process may be used to define a quality of service for various types of connections. Accordingly, based on the identification information for requesting Ethernet element 110, management system 130 may identify the appropriate service configuration for the connection between the requesting and receiving Ethernet elements. Once identified, the configuration may be transferred to receiving Ethernet element 120 to be implemented.

In at least one example, requesting Ethernet element 110 comprises a CE router and receiving Ethernet element 120 comprises a PE router operated by a network provider. These PE routers typically provide communication services to customers by connecting the various CE router locations to one another over the provider network. Accordingly, each customer may use local CE routers at each of their locations, but rely on a plurality of centralized PE routers to connect various CE endpoints.

As an example of configuring these connections, when a new CE router is desired to join the network, the CE router may transfer identification data to the PE router to configure the connection between the PE and CE routers. Once received, the PE router may use a management system to determine the service configuration. In the CE and PE router example, the management system may include various configurations for a variety of different customers. For instance, one customer may require a higher quality of service than another customer. Accordingly, the customer that requires the higher quality of service may have their service configured with a higher quality settings and preferences than the other customer. These higher quality settings may include preferred Internet Protocol (IP) addresses, the amount of bandwidth provided to the CE router, or any other similar setting or preference.

Figure 5:
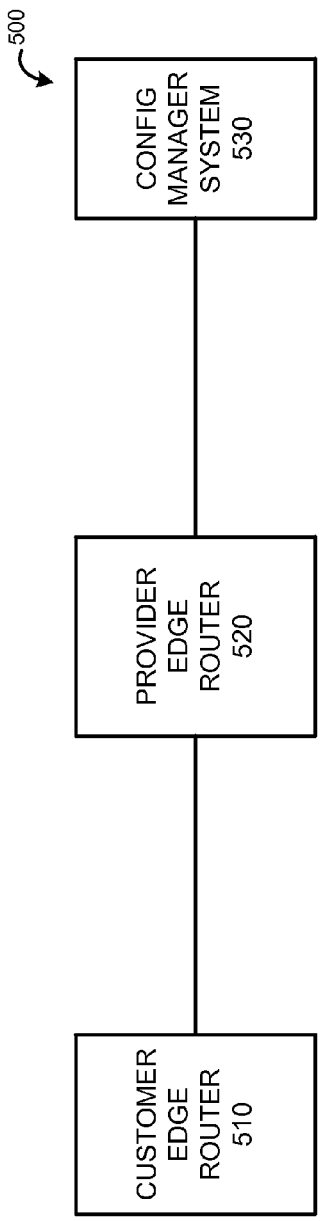
FIG. 5 illustrates a communication system to implement service configurations via Ethernet Local Management Interface.

FIG. 5 illustrates a communication system 500 to implement service configurations via Ethernet Local Management Interface. Communication system 500 includes CE router 510, PE router 520, and configuration manager system 530. In operation, a provider core network may include one or more PE routers, such as PE router 520, which connect CE routers to one another across various geographic regions. For example, a customer may have a first CE router in New York, N.Y. that communicates with a CE router in Los Angeles, Calif. over one or more PE routers and provider links.

As a customer desires to expand or improve the network, the customer may initiate one or more additional edge routers within the network. Accordingly, as the devices are added, the CE router and the PE router may need to be configured with the appropriate service configuration that matches the need of the end customer. For example, if the customer selected a higher quality of service, the resources allocated to the PE and CE connection should be in accordance with the customer selection. Further, because in some examples the PE router connects to multiple CE routers, the PE should be able to allocate different service configurations for each of the connecting customers.

Figure 6:
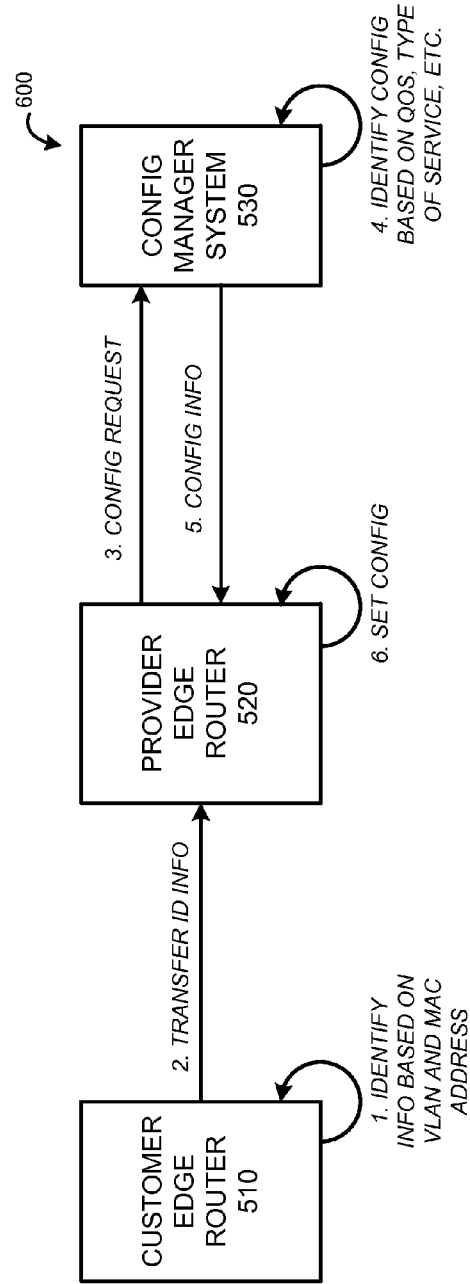
FIG. 6 illustrates an overview of implementing service configurations in a communication system.

FIG. 6 illustrates an overview 600 of implementing service configurations in communication system 500. As depicted in overview 600, CE router 510 identifies identification information based on a VLAN and a MAC address for the router. The VLAN provides the segmentation services that allow a customer to divide the computers and systems on their network from other devices and systems that may be communicating along the same path. In addition to the customer identifier, the MAC address for the CE router may be used to identify the physical device and possibly its role within the communication system. Thus, the data that is included in the identity information may include an identifier for the network that the router is to join and the identity of the individual router.

Once the identity information is determined, the information is transferred via E-LMI to PE router 520. In response to receiving the identity information, PE router 520 transfers a configuration request to configuration manager system 530. In the present example, the request is based on the identification information. Accordingly, the request contains information about the individual router and the network the router is attempting to join. In response to the configuration request, configuration manager system 530 determines a service configuration for PE router 520 based on the identity of CE router 510. In some examples, this identification may be based on the quality of service needed for the connection with CE router 510. For instance, a provider network may include a plurality of service levels for customers to select when they create their customer network. As a result, a first customer may select a quality of service that is higher than a second customer. Thus, configuration manager system 530 may identify a higher quality of service setting for a connection with a first customer router, than a router associated with the second customer.

Upon determination of the service configuration, configuration manager system 530 transfers configuration information to PE router 520, and PE router 520 responsively implements the configuration. Once the configuration is implemented, the customer may communicate using CE router 510 with other CE routers within the customer's network.

Although illustrated in the examples of FIGS. 5-6 using CE and PE routers, it should be understood that the same principles might apply to virtual machines that are to be configured within a cloud environment. For instance, a newly initiated virtual machine may contact another virtual machine within a communication system for a service configuration. This service configuration might include IP address allocation, resource allocation, or any other similar service allocation.

Figure 7:
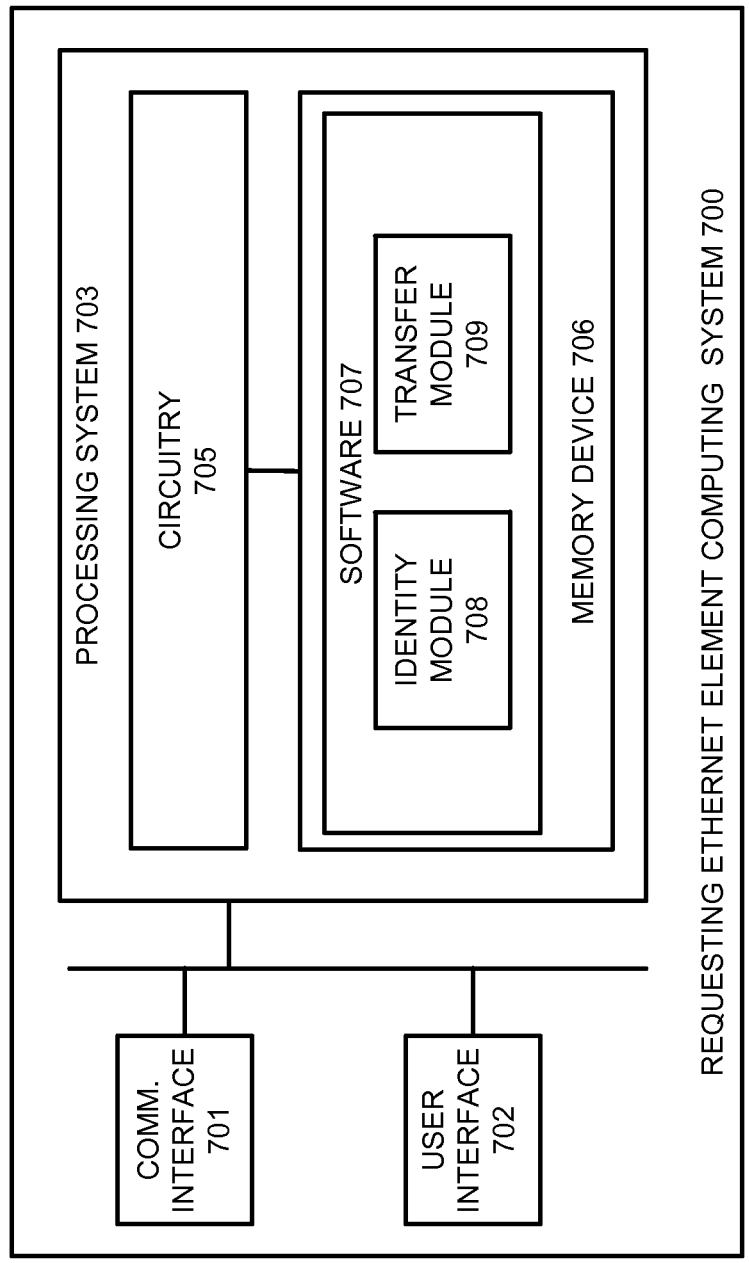
FIG. 7 illustrates a requesting Ethernet element computing system to initiate a determination of service configurations using Ethernet Local Management Interface.

FIG. 7 illustrates a requesting Ethernet element computing system 700 to initiate the determination of service configurations using E-LMI. Requesting Ethernet element computing system 700 is representative of a computing system that may be employed in any computing apparatus, system, or device, or collections thereof, to suitably implement the requesting Ethernet elements, CE routers, and requesting virtual machines described herein. Computing system 700 includes communication interface 701, user interface 702, and processing system 703. Processing system 703 is linked to communication interface 701 and user interface 702. Processing system 703 includes processing circuitry 705 and memory device 706 that stores operating software 707.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof. In particular, communication interface 701 may be configured to communicate with a receiving Ethernet element or a PE router to configure the connection between computing system 700 and the receiving Ethernet element. In some examples, communication interface 701 may further be configured to communicate with one or more external computing devices and provide a gateway between the devices and other elements on a customer network.

User interface 702 comprises components that interact with a user. User interface 702 may include a keyboard, display screen, mouse, touch pad, or some other user input/output apparatus. User interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Operating software 707 comprises computer programs, firmware, or some other form of machine-readable processing instructions. Operating software 707 includes identity module 708 and transfer module 709, although any number of modules might provide the same operation. Operating software 707 may further include an operating system, utilities, drivers, network interfaces, applications, or some other type of software. When executed by circuitry 705, operating software 707 directs processing system 703 to operate requesting Ethernet element computing system 700 as described herein.

In particular, identity module 708 identifies a MAC address and a VLAN for computing system 700. The MAC address is a unique identifier assigned to the network interface for the device, and may be used to identify the device itself. Further, the VLAN may correspond to the network that the requesting device intends to join. Accordingly, identity module 708 may create identification data for computing system 700 based on the device identifier, as well as the network identifier associated with computing system 700.

Once the identification data is determined for computing system 700, transfer module 709 may be used to transfer the identification data to a receiving Ethernet component. In the present example, the identification information is transferred using E-LMI, which is used in configuring network elements. Accordingly, by transferring the identification information for computing system 700, computing system 700 may initiate the establishment of a service configuration between the requesting and the receiving Ethernet components.

Figure 8:
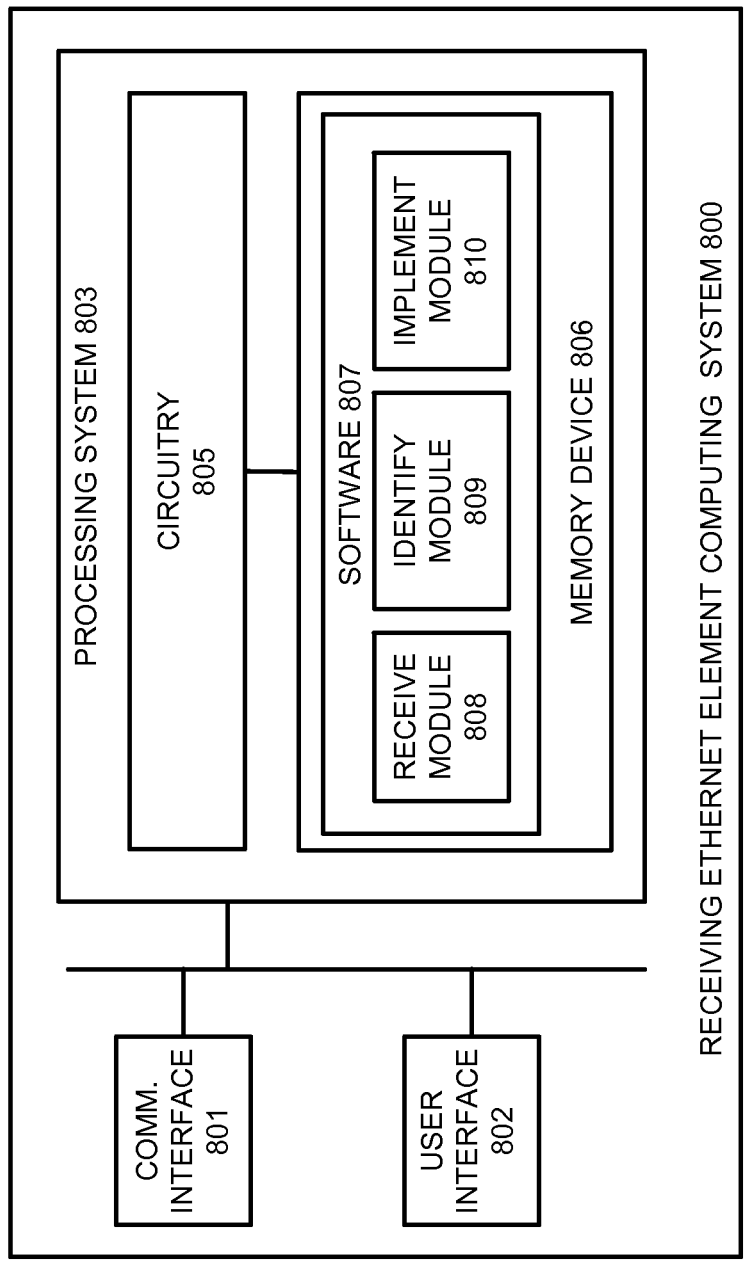
FIG. 8 illustrates a receiving Ethernet element computing system to identify service configurations.

FIG. 8 illustrates a receiving Ethernet element computing system 800 to identify service configurations. Receiving Ethernet element computing system 800 is representative of a computing system that may be employed in any computing apparatus, system, or device, or collections thereof, to suitably implement the receiving Ethernet elements, PE routers, and receiving virtual machines described herein. Computing system 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof. Communication interface 801 may be configured in the present example to communicate with one or more requesting Ethernet elements that request service configurations to join a network. Further, when computing system 800 comprises a PE router, communication interface 801 may be configured to communicate with one or more other PE routers within a provider network.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus. Operating software 807 comprises computer programs, firmware, or some other form of machine-readable processing instructions. Operating software 807 includes receive module 808, identify module 809, and implement module 810, although any number of modules might provide the same operation. Operating software 807 may further include an operating system, utilities, drivers, network interfaces, applications, or some other type of software. When executed by circuitry 805, operating software 807 directs processing system 803 to operate receiving Ethernet device computing system 800 as described herein.

In particular, receive module 808 is configured to receive identification information from a requesting Ethernet element. Responsive to the receiving the identification information, identify module 809 transfers a service configuration request to a configuration management system based on the identification information, and receives configuration information from the management system that corresponds to the requesting device. Once the configuration information is received, implement module 810 implements the service configuration to make available the connection between the requesting device and computing system 800.

In some examples, the service configuration that is determined for the particular requesting element is based on the quality of service. For instance, a higher quality of service may be given to one requesting device over another requesting device for a variety of reasons, including the identity of the customer making the request, the service that the device is intended to perform, or any other quality of service qualification. Accordingly, if computing system 800 acted as a PE router, computing system 800 may provide one service configuration for a first CE router, and a second configuration for a second CE router. These configurations may include particular IP addresses for addressing the individual CE routers, bandwidth configurations, or any other configuration setting between the requesting Ethernet element and the receiving Ethernet element.

Returning to the elements of FIG. 1, requesting Ethernet element 110 and receiving element 120 may each comprise a router, server, memory device, software, processing circuitry, cabling, power supply, network communication interface, structural support, or some other communication or computer apparatus. In particular, requesting Ethernet element 110 may comprise a CE router capable of providing local network services to customers by connecting the customers to other CE routers using a provider network. Further, receiving Ethernet element 120 may comprise PE routers that are provider network elements capable of connecting various CE routers for a plurality of customers.

Configuration management system 130 may comprise a router, server, memory device, software, processing circuitry, cabling, power supply, network communication interface, structural support, or some other communication apparatus. Configuration management system 130 may include databases and other processing instructions that direct management system 130 to identify the appropriate configuration for the connection between Ethernet components. Such configuration processes may include processes to configure the connection based on quality of service for the requesting Ethernet component, the type of service required for operations across the requesting Ethernet component, or any other similar configuration determination.

Communication links 140-141 each use metal, glass, optical, air, space, or some other material as the transport media. Communication link 140 comprises an Ethernet connection that may be used in making E-LMI communications. Communication link 141 may use Time Division Multiplex (TDM), asynchronous transfer mode (ATM), IP, Ethernet, synchronous optical networking (SONET), hybrid fiber-coax (HFC), circuit-switched, communication signaling, wireless communications, or some other communication format, including improvements thereof. Communication link 140-141 may each be a direct link, or can include intermediate networks, systems, or devices, and can include a logical network link transported over multiple physical links.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system to configure Ethernet elements, the method comprising:
   in a requesting Ethernet element, determining identification data based on a media access control (MAC) address and a virtual local area network (VLAN) for the requesting Ethernet element;
   in the requesting Ethernet element, transferring, via Ethernet Local Management Interface (E-LMI), the identification data to a receiving Ethernet element;
   in the receiving Ethernet element, receiving the identification information;
   in the receiving Ethernet element, transferring a service configuration request based on the identification information to a configuration management system; and
   in the receiving Ethernet element, receiving a service configuration from the configuration management system, wherein the service configuration comprises a configuration based on a quality of service for the requesting Ethernet element, and wherein the service configuration comprises an Internet Protocol address configuration for the requesting Ethernet element.

2. The method of claim 1 wherein the requesting Ethernet element comprises a customer edge router.

3. The method of claim 2 wherein the receiving Ethernet element comprises a provider edge router.

4. The method of claim 1 wherein the requesting Ethernet element and the receiving Ethernet element comprise virtual machines.

5. The method of claim 1 further comprising:
   in the receiving Ethernet element, implementing the service configuration for the requesting Ethernet element.

6. A communication system to configure Ethernet elements, the communication system comprising:
   a requesting Ethernet element configured to:
     determine identification data based on a media access control (MAC) address and a virtual local area network (VLAN) for the requesting Ethernet element; and
     transfer, via Ethernet Local Management Interface (E-LMI), the identification data to a receiving Ethernet element; and
   the receiving Ethernet element configured to:
     receive the identification information;
     transfer a service configuration request based on the identification information to a configuration management system; and
     receive a service configuration from the configuration management system, wherein the service configuration comprises a configuration based on a quality of service for the requesting Ethernet element, and wherein the service configuration comprises an Internet Protocol address configuration for the requesting Ethernet element.

7. The communication system of claim 6 wherein the requesting Ethernet element comprises a customer edge router.

8. The communication network of claim 7 wherein the receiving Ethernet element comprises a provider edge router.

9. The communication network of claim 6 wherein the requesting Ethernet element and the receiving Ethernet element comprise virtual machines.

10. The communication network of claim 6 wherein the receiving Ethernet element is further configured to implement the service configuration for the requesting Ethernet element.

11. A computer apparatus to manage service configurations for Ethernet elements, the computer apparatus comprising:

processing instructions that direct a first Ethernet element, when executed by the first Ethernet element, to:
- receive, via Ethernet Local Management Interface (E-LMI), identification information from a second Ethernet element, the identification information based on a media access control (MAC) address and a virtual local area network (VLAN) for the second Ethernet element;
- transfer a service configuration request based on the identification information to a configuration management system; and
- receive a service configuration from the configuration management system, wherein the service configuration comprises a configuration based on a quality of service for the second Ethernet element, and wherein the service configuration comprises an Internet Protocol address configuration for the second Ethernet element; and one or more non-transitory computer readable media that store the processing instructions.

12. The computer apparatus of claim 11 wherein the first Ethernet element comprises a provider edge router.

13. The computer apparatus of claim 12 wherein the second Ethernet element comprises a customer edge router.

14. The computer apparatus of claim 11 wherein the processing instructions further direct the first Ethernet element to implement the service configuration for the second Ethernet element.

* * * * *